Patented May 8, 1934

UNITED STATES PATENT OFFICE 1,958,012

PROCESS FOR THE MANUFACTURE OF ALKALI METAL HYDRIDE

Anthony Moultrie Muckenfuss, Elizabeth, N. J., assignor, by mesne assignments, to E. I. du Pont de Nemours and Company, a corporation of Delaware No Drawing. Application July 28, 1931, Serial No. 553,697

13 Claims. (Cl. 23—204)

This invention relates to the preparation of alkali metal hydride, such as the hydrides of lithium, sodium potassium, rubidium and cæsium. More particularly, this invention relates to a process for the manufacture of sodium hydride.

Heretofore the hydrides of alkali metals have been prepared in small quantities for experimental use or for limited commercial use by laboratory methods or methods requiring extremely careful manipulation and close supervision entirely unsuited for commercial manufacture. Furthermore, in the previous methods of making alkali metal hydride, hydrogen was passed over a body of molten alkali metal to form a surface coating of hydride, agitation of the alkali metal being also resorted to while passing the hydrogen. Vapors of alkali metal have also been hydrogenated but without much success, chiefly because of the rapid dissociation of the hydride as fast as formed. Other methods have been proposed, such as reacting molten alkali metal with hydrogen to form a mixture of hydride and alakali metal which is then ground in a ball mill in the presence of hydrogen to complete the formation of hydride. However, in all of these methods the product is not pure and contains considerable amounts of unconverted alkali metal and such methods possess many inherent difficulties when attempting to apply them to commercial scale operation.

An object of this invention is to provide a method for the manufacture of alkali metal hydride which can be readily applied to commercial scale operation and which will produce an alkali metal hydride of approximately 100% purity. A further object of this invention is to obtain alkali metal hydride in large quantities and in a physical state which will make it very easy to handle, package and ship. A further object of this invention is to directly obtain a product which is pure white, without the need for special purification steps at the end of the main conversion step. Another object is to provide a method of manufacture which is simple in operation and only requires simple and inexpensive apparatus.

This invention accomplishes the above mentioned and other desirable objects by heating finely divided alkali metal distributed in a liquid distributing agent in the presence of hydrogen gas or gases containing hydrogen.

The following examples will illustrate the invention.

Example I 192 grams of tetralin (tetrahydronaphthalene) and 29 grams of sodium were placed in a 2410 cc. bomb in a shaking apparatus operating at 88 R. P. M. in a horizontal position and the bomb evacuated. Then commercial hydrogen was turned in and the bomb heated with a gas flame while being shaken, meanwhile increasing the hydrogen pressure gradually. Absorption of hydrogen began at about 230° C. The bomb was brought to 250° C. and the pressure to 500 lbs. per sq. in. and maintained approximately under these conditions for 7½ hours, at which time absorption of hydrogen had practically ceased, as shown by inappreciable rate of fall in pressure. Upon cooling, relieving the pressure, opening the mob, and filtering, a solid product was obtained which was then washed with toluene and dried in the absence of air. Any other inert volatile liquid, such as benzene, ligroin, etc., may be used for washing. The product was finely divided, light gray sodium hydride. This hydride analyzed approximately 100% pure as determined by taking an aliquot part of the product, reacting it with alcohol of water and determining the volume of hydrogen liberated therefrom and then titrating the resulting alkaline solution with mineral acid until neutralized. The yield of sodium hydride based on the sodium used was about 92%. 90% of the tetralin was recovered, the remaining 10% having been lost while handling and filtering the sodium hydride.

Example II 433 grams of Nujol oil, a water white commercial paraffin oil, and 74 grams of sodium were placed in a 2410 cc. bomb and the contents treated with hydrogen at 500 lbs. per sq. in. and 250° C. as in Example I for 7½ hours. Absorption of hydrogen, which appeared to commence around 230° C., had practically ceased after 2.6 hours, as indicated below.

| Total duration in minutes at 250° C. | Lbs. fall in pressure per minute |
|---|---|
| 7 | 8 |
| 25 | 5.5 |
| 47 | 4.5 |
| 74 | 6.0 |
| 122 | 1.5 |
| 147 | 1.1 |

The average lbs. fall in pressure per minute was 4.5. Upon separating and analyzing the product as in Example I, the Nujol was recovered to the extent of 98.8 per cent, and the yield of sodium hydride on basis of sodium used was 91.4%. The hydride was white, finely divided and 99.6% pure.

Example III 428 grams of Nujol oil and 74 grams of sodium were heated and shaken as in Example I at 250° C., in presence of hydrogen. Absorption of hydrogen appeared to commence around 230° C. The gas pressure was increased at approximately 10 lb. intervals up to 136 lbs. per sq. in and the rate of fall in pressure noted at each pressure up to 136 lbs. Then the pressure was allowed to drop at the same intervals and the rates likewise noted.

The total length of heating at 250° C., was 4⅔ hours. Upon separating and analyzing the solid product as in Example I, the sodium hydride was found to be 100 per cent pure and its yield on the basis of sodium used was 94.8 per cent. Of the Nujol, 98.8% was recovered. The hydride was white and finely divided.

Example IV 432 grams of Nujol oil and 74 grams of sodium were heated and shaken as in Example I, but at 60 lbs. hydrogen pressure per sq. in. and at 106 R. P. M. for the shaking. Absorption appeared to begin around 230° C. The temperature was increased at 10 degree intervals from 260° C. and the rate of fall in pressure noted at each temperature up to 340° C. Then the temperature was allowed to fall at the same intervals and the rates likewise noted.

The total length of heating at 60 lbs. per sq. in. was 7 hours. Upon separating and analyzing the product as in Example I, the sodium hydride was found to be 99.6% pure and its yield on basis of sodium used was 95.9%. The Nujol was recovered to the extent of 98.5%. The hydride was white and finely divided.

Example V 441 grams of Veedol oil, a commercial lubricating oil, and 74 grams of sodium were heated at 280° C., and under 260 lbs. hydrogen pressure per sq. in. for 4.2 hours under the method of operation described in Example I, the shaking being at 106 R. P. M. Absorption of hydrogen began somewhere near 230° C. The rate of fall in pressure during this operation was as follows:—

| Total duration in minutes at 280° C. | Lbs. fall in pressure per minute |
|---|---|
| 10 | 7.4 |
| 20 | 5.7 |
| 30 | 4.4 |
| 40 | 3.5 |
| 50 | 2.5 |
| 60 | 2.5 |
| 70 | 2.2 |
| 80 | 2.0 |
| 90 | 1.0 |
| 100 | 0.5 |
| 120 | 0.6 |
| 140 | 0.6 |
| 160 | 0.4 |
| 230 | 0.25 |
| 250 | 0.1 |

Thereafter there was an inappreciable fall in pressure per minute. The average fall in pressure per minute was 2.24 lbs. per minute. After analyzing the solid products from the bomb as in Example I, the sodium hydride was found to be 92.1% pure and its yield on basis of the sodium was 73.1 per cent. It was dark brown in color, but finely divided. The Veedol, which had been recovered to the extent of 96.4% was dark brown in color and contained about 1% of material insoluble in Veedol but soluble in benzol.

Example VI 454 grams of Sunoco oil, a commercial lubricating oil, and 74 grams of sodium were heated at 280° C., and 260 lbs. hydrogen pressure per sq. in. for 1¾ hours and shaken as in Example IV. Absorption of hydrogen began somewhere around 230° C. The average fall in pressure per minute was 3.1 lbs.

After separating and analyzing the product as in Example I, the sodium hydride was found to be 90% pure and its yield on basis of sodium used was 76.7%. The percent of Sunoco oil recovered was 88.8%. The color of both the finely divided sodium hydride and the Sunoco oil was dark brown, the latter having about 1% deposit, insoluble in Sunoco oil and soluble in benzol.

Example VII 447 grams of Nujol oil and 50.3 grams of potassium were heated at 280° C., in a hydrogen atmosphere and shaken as in Example V. The pressure was first placed at 80 lbs. per sq. in. and it fell at 3 to 5 lbs. per minute till it reached zero on the gauge. Thereafter the pressure was maintained at 260 lbs. until absorption of hydrogen ceased, 49 minutes being required in all. Absorption had begun at 167° C. while heating the mixture up.

After separating and analyzing the solid product as in Example I, the potassium hydride was found to be 100% pure and its yield on basis of potassium used was 91.7%. The percentage of Nujol recovered was 93.3%. The potassium hydride product was white and finely divided.

Any of the above examples may be adapted to semi-continuous operation by stopping the agitation, permitting unattacked alkali metal to settle out and at the same time floating away or drawing off most of the distributing liquid with the finely divided hydride from above the alkali metal, filtering to remove hydride and returning the filtrate to the sodium settled out and continuing the agitation and hydrogenation of the remaining sodium, additional sodium as needed being added to that settled out. It is of course unnecessary to cease agitation in the reaction vessel, since part or all of the reaction mixture may be drawn off into a separate flotation vessel and after separating hydride returning the remaining materials to the reaction vessel with additional distributing liquid and alkali metal as required thus making the process continuous.

Although I have given a variety of hydrocarbons in the above examples as suspending agent for the sodium, the invention is not limited to the use of such distributing or suspending liquids, since any liquid which is inert to the alkali metal and its hydride under the conditions of the process may be used. However, I prefer to use a paraffin hydrocarbon which is liquid at the temperatures used for hydrogenation of the alkali metal. Although the hydride can be prepared at atmospheric pressure or less than atmospheric pressure in the presence of hydrogen, I prefer to use pressures above atmospheric, since the rate of hydrogenation increases with the pressure of hydrogen. I prefer temperatures of about 230° C. to 400° C. for operating my process, since temperatures below 230° C. do not permit the sodium to be converted to hydride with sufficient rapidity for economical operation. Above about 400° C. the hydride dissociates with increasing rapidity which makes necessary the use of higher pressure thus requiring the use of heavier and more expensive apparatus. However, I may use temperatures above 400° C. providing sufficiently great pressures of hydrogen are used to prevent dissociation of hydride as fast as formed. Another reason for preferring the upper limit of 400° C. is, that the distributing or suspended liquids are likely to be affected by higher temperatures.

This invention not only offers the advantage of being adaptable to a continuous process as well as a batch process, but offers the further advantage that the fused alkali metal can be distributed in a very finely divided condition by simple agitation which also results in the hydride being produced in a very finely divided form making it easily handled and readily poured when dry. Another advantage of the invention is that the hydride has a very pure white appearance which is of advantage in marketing the product. Furthermore, the inert distributing liquid protects the alkali metal hydride from the air during those stages in its preparation wherein there is a possibility of air coming in contact with the reaction mixture. It is also an easy matter to directly obtain and furnish the hydride in the form of a paste or sticky liquid containing sufficient inert liquid to protect the hydride from the air so that it may be handled by the purchaser or user with the minimum hazard. The separation of a substantially pure hydride product by simple filtration or distillation of distributing liquid from the hydride makes the process exceedingly simple and inexpensive.

I claim:

1. In a process for the manufacture of alkali metal hydride of substantially 100% purity the step which comprises heating finely divided alkali metal distributed within an inert organic liquid distributing agent in the presence of hydrogen.

2. In a process for the manufacture of alkali metal hydride of substantially 100% purity the step which comprises heating and agitating a mixture of alkali metal and an inert organic liquid distributing agent in the presence of hydrogen.

3. In a process for the manufacture of alkali metal hydride of substantially 100% purity the step which comprises heating and agitating a mixture of alkali metal and a liquid hydrocarbon distributing agent in the presence of hydrogen.

4. In a process for the manufacture of alkali metal hydride of substantially 100% purity the step which comprises heating and agitating a mixture of alkali metal and an inert liquid paraffin hydrocarbon distributing agent in the presence of hydrogen.

5. In a process for the manufacture of sodium hydride of substantially 100% purity the step which comprises heating and agitating a mixture of sodium and an inert liquid paraffin hydrocarbon distributing agent in the presence of hydrogen.

6. In a process for the manufacture of sodium hydride of substantially 100% purity the step which comprises heating and agitating a mixture of sodium and an inert liquid paraffin hydrocarbon distributing agent in the presence of hydrogent under pressure.

7. In a process for the manufacture of sodium hydride of substantially 100% purity the step which comprises heating and agitating a mixture of sodium and an inert liquid paraffin hydrocarbon distributing agent in the presence of hydrogen between about 230° C. and 400° C.

8. In a process for the manufacture of sodium hydride of substantially 100% purity the step which comprises heating and agitating a mixture of sodium and an inert liquid paraffin hydrocarbon distributing agent in the presence of hydrogen between about 230° C. and 400° C. under pressure.

9. A process for the manufacture of alkali metal hydride of substantially 100% purity which comprises heating and agitating a mixture of alkali metal and an inert liquid distributing agent in the presence of hydrogen, flotating and separating alkali metal hydride with distributing agent from unchanged alkali metal, separating said alkali metal hydride from the distributing agent and returning the latter to the unchanged alkali metal for further heating and agitation while adding further quantities of alkali metal and distributing agent to the unchanged alkali metal.

10. A process for the manufacture of alkali metal hydride of substantially 100% purity which comprises heating and agitating a mixture of alkali metal and an inert liquid distributing agent in the presence of hydrogen under pressure between about 230° C. and 400° C., flotating and separating alkali metal hydride with distributing agent from unchanged alkali metal, separating said alkali metal hydride from the distributing agent and returning the latter to the unchanged alkali metal for further heating and agitating while adding further quantities of alkali metal and distributing agent to the unchanged alkali metal.

11. A process for the manufacture of sodium hydride of substantially 100% purity which comprises heating and agitating a mixture of sodium and an inert liquid distributing agent in the presence of hydrogen under pressure between about 230° C. and 400° C., flotating and separating sodium hydride with distributing agent from unchanged sodium, separating said sodium hydride from the distributing agent and returning the latter to the unchanged sodium for further heating and agitating while adding further quantities of sodium and distributing agent to the unchanged sodium.

12. A process for the manufacture of sodium hydride of substantially 100% purity which comprises heating and agitating a mixture of sodium and an inert liquid paraffin hydrocarbon distributing agent in the presence of hydrogen under pressure between about 230° C. and 400° C., flotating and separating sodium hydride with distributing agent from unchanged sodium, separating said sodium hydride from the distributing agent and returning the latter to the unchanged sodium for further heating and agitating while adding further quantities of sodium and distributing agent to the unchanged sodium.

13. A process for the manufacture of potassium hydride of substantially 100% purity which comprises heating and agitating a mixture of potassium and an inert liquid paraffin hydrocarbon distributing agent in the presence of hydrogen under pressure between about 230° C. and 400° C., flotating and separating potassium hydride with distributing agent from unchanged potassium, separating said potassium hydride from the distributing agent and returning the latter to the unchanged potassium for further heating and agitating while adding further quantities of potassium and distributing agent to the unchanged potassium.

ANTHONY MOULTRIE MUCKENFUSS.